United States Patent [19]
Afanasjev et al.

[11] 3,718,817
[45] Feb. 27, 1973

[54] DEVICE FOR DETERMINING THE LEVEL AND SURFACE PROFILE OF MATERIALS UTILIZING HARD RADIATION

[75] Inventors: Vadim Nikolaevich Afanasiev, Bolotnikovskaya ulitsa, 40, korpus 4, kv. 23, Moscow; Jury Pavlovich Belyaev, ulitsa Sechenova, 58, kv. 30, Zhdanov; Vladimir Olegovich Gaiduchik, Mariupolskaya ulitsa, 4, kv. 47, Moscow; Pavel Lukich Gruzin, polschad Pryamikova, 6, kv. 21, Moscow; Nikolai Alexandrovich Konkin, Aviamotornaya ulitsa, 49/1, kv. 102, Moscow; Valery Vasilievich Megarsky, Verkhnaya Pervomaiskaya ulitsa, 24/17, kv. 17, Moscow; Boris Nikolaevich Okunev, ulitsa zol i Alexandra Kos-modemyanskikh, 35/1, kv. 19, Moscow; Jury Alexandrovich Trokin, Baikalskaya ulitsa, 40/17, kv. 70, Moscow, all of U.S.S.R.

[22] Filed: Nov. 27, 1970

[21] Appl. No.: 93,280

[52] U.S. Cl.........250/43.5 FL, 250/83.3 D, 250/105
[51] Int. Cl..............................................G01n 21/24
[58] Field of Search..........250/43.5 FL, 83.3 D, 105

[56] References Cited

UNITED STATES PATENTS 3,099,744  7/1963  Spooner...................250/43.5 F.L.
2,708,721  5/1955  Ziffer........................250/43.5 FL
3,358,279  12/1967  Chope...............................250/105

*Primary Examiner*—Archie R. Borchelt
*Attorney*—Waters, Roditi, Schwartz & Nissen

[57] ABSTRACT

The invention relates to devices for determining the level and surface profile of materials.

The device according to the invention is characterized in that it contains a collimated hard electromagnetic radiation source complete with a servo drive, a collimated reflected radiation reciever also with a servo drive and a means for determining the relative position of the irradiated zone on the inspected surface and the receiving zone. The collimated radiation source has a means for periodically varying the position of the hard electromagnetic radiation flux relative to the axis of collimation. The means for determining the relative position of the irradiated and receiving zones comprises a phase detector which is electrically connected to the means for periodically varying the position of the radiation flux and serves to route the signal coming from the collimated radiation receiver in accordance with the phase of the control signal coming from the means for periodically varying the position of the radiation flux, and at least two integrating networks which are electrically connected to the phase detector and each of which accepts the signal from the phase detector in accordance with the phase of the control signal.

2 Claims, 5 Drawing Figures

DEVICE FOR DETERMINING THE LEVEL AND SURFACE PROFILE OF MATERIALS UTILIZING HARD RADIATION

The present invention relates to devices for contactless determination of the level and surface profile of objects by use of hard electromagnetic radiation, and more specifically to devices serving to determine the level and surface profile of materials, for example the position of the stock line in blast furnaces.

There exist devices for determining the level and surface profile of materials, notably the position of the stock line in blast furnaces, in which a flux of hard electromagnetic radiation from a collimated source actuated by a servo drive, is reflected from the irradiated zone of the surface being inspected and is registered by a collimated radiation receiver having a receiving zone, whose output signal goes to a means for determining the relative position of the irradiated and receiving zones and controlling the receiver servo drive.

These devices use a two-channel radiation receiver, so that the output signals coming from the two channels in parallel and simultaneously to a means for determining the relative position of the irradiated and receiving zones are compared, and the comparison signal controls the servo drive of the collimated radiation receiver in such a way that it is beamed on the center of the irradiated zone.

The use of a two-channel radiation receiver, known to have unstable characteristics, results in that there arises a random instrumental error caused by the random drift in the sensitivity of the two channels.

Besides, the output signals from the two channels are fed to a means for determining the relative position of the irradiated and receiving zones through two separate parallel paths whose elements (amplifiers, pulse-shapers, amplitude discriminators, etc.) have transfer characteristics which vary with time, so that there arises a further random instrumental error.

With time, some elements in the radiation receiver or in the output-signal transmission path have to be replaced or repaired, and this gives rise to a difference in characteristics between the two channels of the radiation receiver or the two output-signal transmission paths. Since in most cases such devices are installed on continuously operating plant (such as the stock indicators of blast furnaces) and cannot be checked or calibrated, an unaccounted-for systematic error arises, which may be infinitely large.

Furthermore, a two-channel radiation receiver is inevitably large in size and complex in design, nor can it use radiation detectors with a large effective surface area.

A major disadvantage of these devices is the necessity to use two separate stabilized power supplies for the two channels of the receiver.

The object of the present invention is to provide a device for determining the level and surface profile of materials, for example the position of the stock line in blast furnaces, securing high accuracy of measurement.

In accordance with this object in a device for determining the level and surface profile of materials, for example, the position of the stock line in blast furnaces, in which the flux of hard electromagnetic radiation from a collimated source actuated by a servo drive is reflected from the irradiated zone on the inspected surface and is registered by a collimated radiation receiver which has a receiving zone and whose output signal goes to a means for determining the relative position of the irradiated and receiving zones and controlling the receiver servo drive, the collimated source incorporates, according to the invention, a means for periodically varying the position of the radiation flux relative to the axis of collimation, while the means for determining the relative position of the irradiated and receiving zones incorporates a phase detector which is electrically connected to the means for periodically varying the position of the radiation flux and which routes the signal coming from the collimated radiation receiver in accordance with the phase of the control signal coming from the means for periodically varying the position of the radiation flux, and at least two integrating networks which are electrically connected to the phase detector and each of which accepts the signal from the phase detector in accordance with the phase of the control signal, while the difference in signal between them is used to position the receiver.

To enhance the speed of response and reliability of the device disclosed herein, the means for periodically varying the position of the radiation flux should preferably be made in the form of a rotating chopper with an odd number of notches, in which case the source should contain at least one pair of radiators arranged so that when the chopper is rotating one radiator is covered and the other is opposite a notch at any time.

Owing to such an arrangement, the device disclosed herein measures the level and surface profile of materials with a high degree of accuracy, using radiators of low activity, and offers high reliability, simplicity and low cost.

The invention will be best understood from the following description of a preferred embodiment, when read in connection with the accompanying drawings, wherein.

Figure 3A:
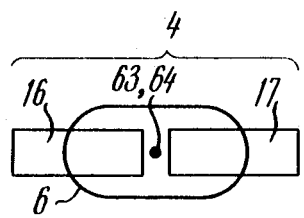

FIG. 3a, b and c shows the relative positions of the irradiated and receiving zones, as determined by the device disclosed herein.

A device for determining the level and surface profile of materials according to the invention will be described with special reference to determining the position of the stock line in a blast furnace.

Figure 1:
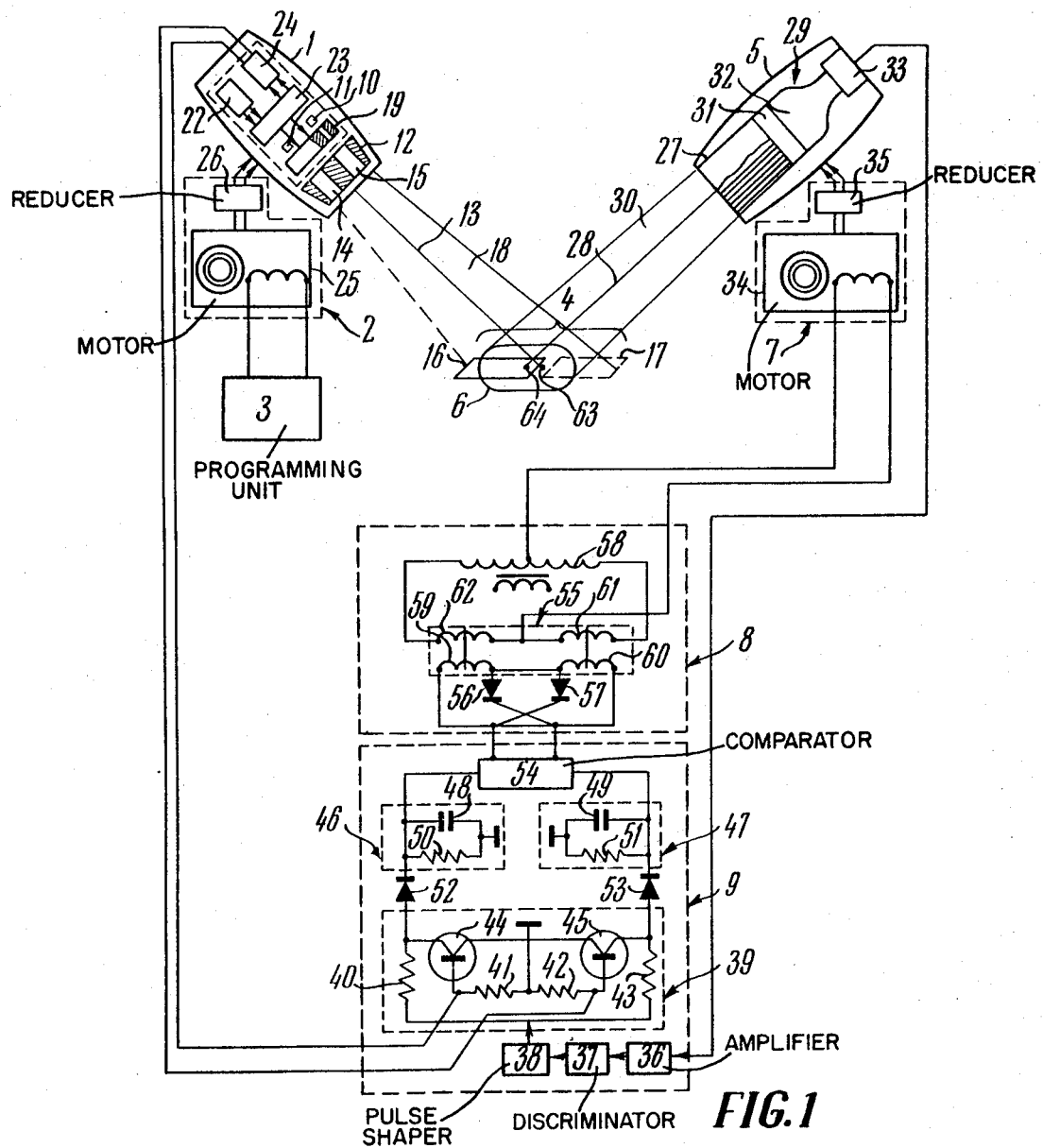
FIG. 1 is a schematic diagram of the device disclosed herein.

Referring to FIG. 1, there is a device which comprises a radiation source 1 actuated by a servo drive 2 with a programming unit 3, and producing an irradiated zone 4 on the surface of the blast-furnace stock (omitted in the drawing). Use is made of hard electromagnetic radiation which, in this case, is gamma radiation from a radioactive isotope.

The device also comprises a collimated radiation receiver 5 having a receiving zone 6 and fitted with a servo drive 7 with a control unit 8, and a means 9 for determining the relative position of the irradiated and receiving zones, 4 and 6, respectively.

The housing of the radiation source 1 holds two radiators 10 and 11 made in the form of capsules holding the above-mentioned radioactive isotope, a collimator 12 having the axis of collimation 13 and incorporating two channels 14 and 15 producing half-zones 16 and 17 in the irradiated zone 4, and a means for periodically varying the position of the radiation flux 18 relative to the collimation axis 13.

Figure 2:
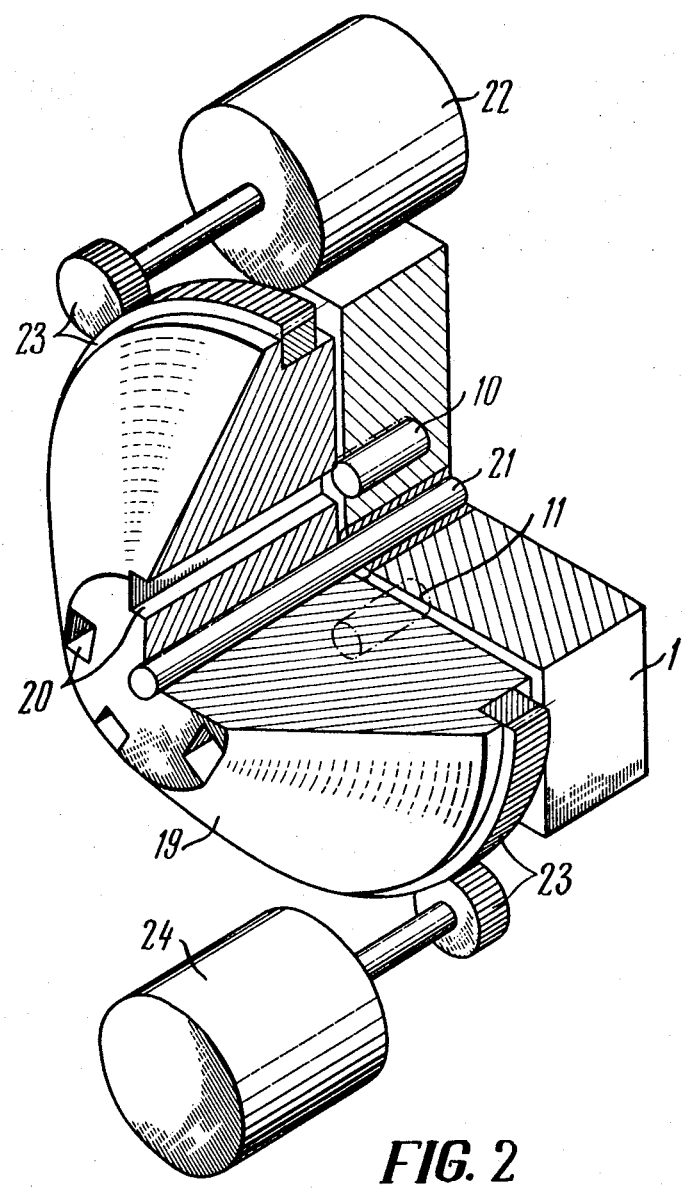
FIG. 2 is a cut-away view of a means for periodically varying the position of the radiation flux in the device of FIG. 1.

The said means is a rotating chopper 19 (FIG. 2) having an odd number of notches 20 and located between the collimator 12 and the radiators 10 and 11 arranged diametrically opposite to the rotation axis 21 of the chopper 19. The latter is actuated by a motor 22 (FIG. 1) with a reducer 23, and is mechanically coupled to a synchronous alternator 24.

The servo drive 2 of the radiation source 1 comprises a motor 25 and a reducer 26.

The housing of the radiation receiver 5 holds a multi-channel collimator 27 having the collimation axis 28 and a scintillation counter 29 which registers the reflected radiation flux 30 and consists of a detector 31, a photomultiplier tube 32, and a pulse preamplifier 33.

The servo drive 7 of the radiation receiver 5 comprises a motor 34 and a reducer 35.

The pulse preamplifier 33 is connected through an amplifying stage 36, a discriminating stage 37, and a pulse-shaping stage 38 to a means 9 for determining the relative position of the irradiated and receiving zones, 4 and 6 respectively, comprising a phase detector 39 using resistors 40 through 43 and transistors 44 and 45 and electrically connected to the alternator 24, and two integrating networks 46 and 47 electrically connected to the phase detector 39 and using capacitors 48 and 49 and resistors 50 and 51, respectively. Placed between the outputs of the phase detector 39 and the inputs of the integrating networks 46 and 47 are crystal diodes 52 and 53. The outputs of the integrating networks 46 and 47 are connected to a comparison stage 54 which is a differential amplifier.

The outputs of the means 9 for determining the relative position of the irradiated (4) and receiving (6) zones are connected to the control unit 8 of the servo drive 7, comprising a magnetic amplifier 55, crystal diodes 56 and 57, and a transformer 58. The magnetic amplifier 55 has two control windings 59 and 60, and two gate windings 61 and 62.

The device disclosed herein operates as follows.

The flux 18 (FIG. 1) of hard electromagnetic radiation beamed onto the surface of the stock in the blast furnace by the radiators 10 and 11 passes through the notches 20 in the chopper 19, is collimated by the collimator 12, and produces the half-zones 16 and 17 of the irradiated zone 4 on the surface of the stock. The chopper 19 is actuated by the motor 22 via the reducer 23, so that it interrupts the radiation flux at regular intervals, and the half-zones 16 and 17 are irradiated in turn at a definite repetition rate.

In addition to the chopper 19, the motor 22 and the reducer 23 also drive the synchronous alternator 24. As a result, the a.c. signal generated by the alternator is in phase and in step with the irradiation of the half-zones 16 and 17, that is, the half-cycles of one polarity are coincident with the irradiation of one half-zone while the half-cycles of the opposite polarity are coincident with the irradiation of the other half-zone.

The receiver 5 registers only the radiation reaching it from the receiving zone 6 through the multi-channel collimator 27.

The detector 31, the photo-multiplier tube 32 and the pulse preamplifier 33 convert the reflected radiation flux 30 coming through the collimator 27 into an electric pulse signal which is then relayed to the means 9 for determining the relative position of the irradiated (4) and receiving (6) zones.

The signal goes through the amplifying stage 36 to the discriminating stage 37 which eliminates the pulses caused by the noise of the photo-multiplier tube 32 and some of the pulses produced by background radiation. The pulses transmitted by the discriminating stage 37 are shaped by the pulse-shaping stage 38 and are applied to the input of the phase detector 39.

The resistors 40 and 43 convert the control signal furnished by the synchronous alternator 24 into two signals in anti-phase. These signals are applied to the bases of the transistors 44 and 45, thereby cutting them off in turn and gating the outputs of the phase detector 39, from which the shaped signal pulses are fed via the crystal diodes 52 and 53 to the input of the integrating networks 46 and 47.

Since the control signal furnished by the alternator 24 is in phase and in step with the irradiation of the half-zones 16 and 17, the integrating network 46 accepts the pulses produced by the quanta scattered back from the half-zone 16 and the integrating network 47 accepts the pulses produced by the quanta scattered back from the half-zone 17. The strength of the signal reaching each of the integrating networks 46 and 47 depends on how much of the respective a half-zone 16 and 17 is within the area of the receiving zone 6.

In the integrating networks 46 and 47, the pulse signal is averaged, that is, converted to a d.c. signal whose direct component is proportional to the strength of the pulse signal.

The output signals of the integrating networks 46 and 47 are fed to the comparison stage 54 which subtracts these signals and presents an amplified difference signal across its outputs.

According to polarity, the output signal of the comparison stage 54 goes either through the crystal diode 56 to the control winding 59 of the magnetic amplifier 55 or through the crystal diode 57 to the control winding 60 of the same magnetic amplifier. As this happens, the impedance of the gate windings 61 and 62 of the magnetic amplifier 55 is changed, and the control winding of the motor 34 is energized with current coming now from the left and now from the right-hand half of the secondary of the transformer 58.

Consider the operation of the device disclosed herein as a stock indicator for blast furnaces.

Assume that at some instant the motor 25 actuates the radiation source 1 by command from the programming unit 3 so that the position of the collimation axis 3 in space is changed according to a predetermined program. Then in the embodiment under consideration the irradiated zone 4 will move across the surface of the stock from left to right.

Now assume that the center 63 of the irradiated zone 4 is coincident with the center 64 of the receiving zone 6 (FIG. 3a) at a certain instant. Then, equal parts of the half-zones 16 and 17 of the irradiated zone 4 will be within the area of the receiving zone 6, and the integrating networks 46 and 47 will accept pulse signals of equal strength. Under the circumstances, the signal across the output of the comparison stage will be zero, the current in the control windings 59 and 60 will also be zero, the impedance of the gate windings 61 and 62 will be a maximum, no voltage will be impressed on the control winding of the motor 34, the motor will be stationary, and the radiation receiver 5 and, as a consequence, the receiving zone 6 will not move across the surface of the stock.

Figure 3B:
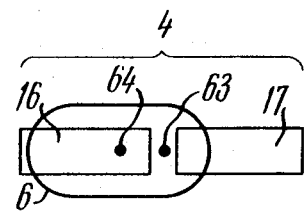

Now let the center 63 (FIG. 3b) of the irradiated zone be to the right of the center 64 of the receiving zone. In this case, the part of the half-zone 16 inside the area of the receiving zone 6 will be larger than the part of the half-zone 17 inside the same area. As a result, the pulse signal reaching the integrating network 46 will be stronger than that reaching the integrating network 47. The signal appearing across the output of the comparison stage 54 will be in a polarity such that there will be a current flowing only in the control winding 60 of the magnetic amplifier 55. The impedance of the gate winding 61 of the magnetic amplifier 55 will be decreased, the control winding of the motor 34 will be energized with voltage from the right-hand half of the secondary of the transformer 58, and the motor 34 will move the radiation receiver until the center 64 of the receiving zone 6 is again aligned with the center 63 of the irradiated zone.

Figure 3C:
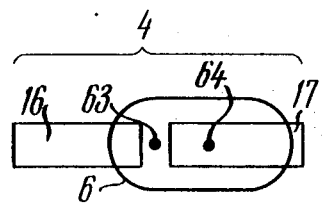

Now assume that the center 64 (FIG. 3c) of the receiving zone 6 is to the right of the center 63 of the irradiated zone. Under these conditions, the part of the half-zone 16 inside the area of the receiving zone 6 will be smaller than the part of the half-zone 17 located in the same area. As a result, the pulse signal reaching the integrating network 46 will be weaker than that reaching the integrating network 47. Now the signal appearing across the output of the comparison stage 54 will energize the control winding 59 of the magnetic amplifier, the impedance of the gate winding 62 of the amplifier will be decreased, and the control winding of the motor 34 will be energized with voltage from the left-hand half of the secondary of the transformer 58. The motor 34 will move the radiation receiver 5 until the center 64 of the receiving zone 6 is again aligned with the center 63 of the irradiated zone 4.

In this way, the device disclosed herein continually moves the irradiated (4) and receiving (6) zones so that they are held in alignment with each other across the entire surface of the stock, thereby providing for continuous measurement of the angular coordinates of the collimation axis 13 of the radiation source 1 and the collimation axis 28 of the radiation receiver 5, that is, furnishing data for the subsequent computation of coordinates of the stock line.

The device disclosed herein measures the coordinates of the inspected surface of materials with high accuracy owing to a reduction in the random instrumental error, since the device uses only one scintillation counter for the reflected radiation, and this eliminates any effect of random variations in its characteristics with time and makes unnecessary a constant watch on an adjustment of its sensitivity.

Owing to the above-mentioned advantage, the device disclosed herein has an instrumental error of a low as 1 to 3 percent. Besides, it need not be checked or adjusted throughout its service life. This is especially important when it is used to measure the surface profile of materials in a closed space, for example, the position of the stock line in blast furnaces where the stock indicator cannot be checked in principle, while the data it supplies serve as a basis for important decisions concerning the operation of the plant.

What is claimed is:

1. A device for inspecting and determining the level and surface profile of materials, such as the position of a material stock line in blast furnaces, comprising: a collimated radiation source providing a flux of hard electromagnetic radiation and an irradiated zone on the inspected material surface; means for moving said radiation source along said inspected surface in a predetermined programmed path; means for periodically varying the position of said hard electromagnetic radiation flux relative to the collimating axis; a collimated radiation receiver having a receiving zone receiving and intercepting radiation flux reflected from said surface; means for moving said reflected radiation flux receiver; means for determining the relative positions of said irradiated and receiving zones, said last-mentioned means receiving an output signal from said reflected radiation receiver and in response thereto controlling said reflected radiation receiver moving means; said means for determining the relative position of said irradiation and receiving zones including a phase detector, said phase detector being electrically connected to said means for periodically varying the position of said electromagnetic radiation flux and adapted to direct the output signal of said radiation receiver in response to the phase of a control signal generated by said means for periodically varying the position of said radiation flux; said means for determining the relative position of said irradiated and receiving zones including at least two integrating networks, said networks being electrically connected to said phase detector and being each adapted to receive the output signal directed by said phase detector; and means for positioning said radiation receiver in response to differentials in the signals received by said integrating networks.

2. A device as claimed in claim 1, in which said means for periodically varying the position of the radiation flux comprises a rotating chopper having an odd number of notches, and said collimated radiation source comprises at least one pair of radiation means, said chopper at any time interval covering one of said radiation means, and the other radiation means being concurrently in alignment with one of said notches.

* * * * *